United States Patent Office 3,055,726
Patented Sept. 25, 1962

3,055,726
METHOD AND COMPOSITION FOR PREVENTION OF DEPOSITION OF METAL IONS IN ALKALINE MEDIUM AND FOR DYEING
Hermann Rudy, Heidelberg, and Karl Schuster, Ludwigshafen (Rhine), Germany, assignors, by mesne assignments, to Hagan Chemical & Controls, Inc., Pittsburgh, Pa., a corporation of Pennsylvania
No Drawing. Filed Dec. 13, 1957, Ser. No. 702,550
Claims priority, application Germany Dec. 19, 1956
13 Claims. (Cl. 8—82)

This invention relates to chemical composition of matter and has for its object the provision of a chemical composition consisting of polymeric phosphates and a substance which will enable the polymeric phosphate to maintain its sequestering ability even in alkaline hard water.

The addition of polymeric phosphates to water containing calcium, magnesium and polyvalent metals, e.g. iron is old in the art. It is further known that the polymeric phosphates form soluble complexes with these metal-ions only in neutral or acid water whereas the polymeric phosphates lose their sequestering ability (which is by far stronger than those of other sequestering agents) in alkaline water.

It is now an object of this invention to provide a method and means for treating commercial and impure alkaline water to solubilize the iron and other polyvalent metal ions as well as calcium and magnesium present in the alkaline water.

Other objects will be apparent as the invention is more fully hereinafter disclosed.

In accordance with these objects it was now surprisingly discovered that the polymeric phosphates maintain their sequestering ability even in alkaline water if a member of the group consisting of tri-ethanolamine, nitrilo-tri-acetic-acid, polycarboxylic poly-amino-acid, hydroxy-carboxylic acid is added thereto.

It was further found that the first mentioned member shows a better action than any other member of this group.

| No. | pH | hardness (German degrees) | added quantity of— | | | |
|---|---|---|---|---|---|---|
| | | | polymeric phosphate | triethanolamine | | |
| 1a | 10 | 12 | | | (1) | |
| 1b | 10 | 12 | 1.4 | | (1) | |
| 1c | 10 | 12 | | 1.4 | (1) | |
| 1d | 10 | 12 | 1.2 | 0.2 | (2) | |
| 2a | 12.7 | 12 | | | (1) | |
| 2b | 12.7 | 12 | 2 | | (1) | |
| 2c | 12.7 | 12 | | 2 | (1) | |
| 2d | 12.7 | 12 | 1.8 | 0.2 | (2) | |
| 3a | 11.5 | 30 | | | (1) | polymeric phosphate=tripoly phosphate (in g.) |
| 3b | 11.5 | 30 | 4 | | (1) | |
| 3c | 11.5 | 30 | | 4 | (1) | |
| 3d | 11.5 | 30 | 3.4 | 0.6 | (2) | |
| 4a | 12.7 | 30 | | | (1) | |
| 4b | 12.7 | 30 | 11.2 | | (1) | |
| 4c | 12.7 | 30 | | 11.2 | (1) | |
| 4d | 12.7 | 30 | 9.6 | 1.6 | (2) | |
| 5a | 12.7 | 10 | | | (1) | |
| 5b | 12.7 | 10 | 0.7 | | (1) | |
| 5c | 12.7 | 10 | | 0.7 | (1) | |
| 5d | 12.7 | 10 | 0.6 | 0.1 | (2) | |
| 6a | 10 | 12 | | | (1) | |
| 6b | 10 | 12 | 2.2 | | (1) | |
| 6c | 10 | 12 | | 2.2 | (1) | polymeric phosphate=sodium-heptapolyphosphate (in g.) |
| 6d | 10 | 12 | 1.5 | 0.7 | (2) | |
| 7a | 11.5 | 20 | | | (3) | |
| 7b | 11.5 | 20 | 1.52 | | (3) | |
| 7c | 11.5 | 20 | | 1.52 | (3) | |
| 7d | 11.5 | 20 | 1.3 | 0.22 | (4) | |
| 8a | 12.7 | 30 | | | (3) | polymeric phosphate=Graham's salt (in g.) |
| 8b | 12.7 | 30 | 4.05 | | (3) | |
| 8c | 12.7 | 30 | | 4.05 | (3) | |
| 8d | 12.7 | 30 | 3.45 | 0.6 | (4) | |

1 Solution yellow; Fe(OH)$_3$ precipitates. When cooking solution turns brown.
2 Solution remains clear, even when cooking several hours.
3 Solution turns yellow when standing three or more hours.
4 Solution remains clear after standing five days.

The efficiency of the new means will become apparent when reading the following table where the stated amounts of polymeric phosphate and triethanolamine were added in any case to 1 liter of water containing 4 mg. of Fe$^{+3}$.

The following example shows that also coloring of cotton yarn will be improved by the addition of the means according to the invention together with the dyestuff.

*Example*

To 200 l. of commercial water (12° German hardness) containing about 0.1 mg. Fe$^{+3}$/1 are added 1 kilogram of "Benzoheliotrop B" (see: "Substantive Farbstoffe I der Farbenfabriken Bayer, Leverkusen, Seite 179)
500 gram of sodium carbonate
5 kilogram of sodiumsulfate 50 kilogram of cotton yarn are then colored in this solution. The final product shows dull stains and its resistance against rubbing is poor.

If the same procedure is made under the same conditions with the exception of using instead of 1 kilogram of "Benzoheliotrop B" 6.5 kilogram a mixture consisting of 80 parts of "Benzoheliotrop B"
16 parts of the sodium salt of ethylene-diamine-tetra-acetic acid
4 parts of sodiumtripolyphosphate a brilliant and equal colored product is obtained.

We claim:

1. The process of inhibiting the precipitation of calcium, magnesium, iron, and other polyvalent metals in an aqueous alkaline solution of a pH-value not substantially exceeding a pH of about 12.7, said process consisting in adding to such a solution a mixture of a polymeric akali metal phosphate and triethanolamine in an amount sufficient to react substantially completely with said polyvalent metals and to form therewith soluble complex compounds, the proportion of said polymeric alkali metal phosphate to said triethanolamine being at least 2:1, the amount of said mixture being added to said aqueous alkaline solution being at least 0.7 g./l.

2. The process of inhibiting the precipitation of calcium, magnesium, iron, and other polyvalent metals in an aqueous alkaline solution of a pH-value not substantially exceeding a pH of about 12.7, said process consisting in adding to such a solution a mixture of a polymeric alkali metal phosphate and an alkali metal salt of ethylene diamine tetra-acetic acid in an amount sufficient to react substantially completely with said polyvalent metals and to form therewith soluble complex compounds, the proportion of said polymeric alkali metal phosphate to said alkali metal salt of ethylenediamine tetra-acetic acid being about 1:4, the amount of said mixture being added to said aqueous alkaline solution being at least 0.7 g./l.

3. The process of inhibiting the precipitation of calcium, magnesium, iron, and other polyvalent metals in an aqueous alkaline solution of a pH-value not substantially exceeding a pH of about 12.7, said process consisting in adding to such a solution a mixture of a polymeric alkali metal phosphate and triethanolamine in an amount sufficient to react substantially completely with said polyvalent metals and to form therewith soluble complex compounds, the proportion of said polymeric alkali metal phosphate to said triethanolamine being between about 2:1 and about 9:1, the amount of said mixture being added to said aqueous alkaline solution being at least 0.7 g./l.

4. In the process of brilliantly and evenly dyeing textile fibers in alkaline solution, the steps which comprise adding to the alkaline dye bath an alkali metal polyphosphate and triethanolamine in an amount sufficient to react substantially completely with alkaline earth metals, iron, and other polyvalent metals present in said dyebath so as to form a soluble complex compound with said polyvalent metals, the proportion of said alkali metal polyphosphate to said triethanolamine being at least 2:1, the amount of said polyphosphate and triethanolamine being added to said alkaline dye bath being at least 0.7 g./l., and dyeing such fibers therein.

5. In the process of brilliantly and evenly dyeing textile fibers in alkaline solution, the steps which comprise adding to the alkaline dye bath an alkali metal polyphosphate and triethanolamine in an amount sufficient to react substantially completely with alkaline earth metals, iron, and other polyvalent metals present in said dye bath so as to form a soluble complex compound with said polyvalent metals, the proportion of said alkali metal polyphosphate to said triethanolamine being between about 2:1 and about 9:1, the amount of said polyphosphate and triethanolamine being added to said alkaline dye bath being at least 0.7 g./l., and dyeing such fibers therein.

6. In the process of brilliantly and evenly dyeing textile fibers in alkaline solution the steps which comprise adding to the alkaline dye bath an alkali metal polyphosphate and an alkali metal salt of ethylenediamine tetra-acetic acid in an amount sufficient to react substantially completely with alkaline earth metals, iron, and other polyvalent metals present in said dye bath so as to form a soluble complex compound with said polyvalent metals, the proportion of said alkali metal polyphosphate to said alkali metal salt of ethylenediamine tetra-acetic acid being about 1:4, the amount of said polyphosphate and said amino acid being added to said alkaline dye bath being at least 0.7 g./l., and dyeing such fibers therein.

7. In the process of brilliantly and evenly dyeing textile fibers in alkaline solution, the steps which comprise adding to the alkaline dye bath an alkali metal polyphosphate and an alkali metal salt of an alkylene polyamine polyacetic acid, in an amount sufficient to react substantially completely with alkaline earth metals, iron, and other polyvalent metals present in said dye bath so as to form a soluble complex compound with said polyvalent metals, the proportion of said alkali metal polyphosphate to said alkali metal salt of an alkylene polyamine polyacetic acid being about 1:4, the amount of said polyphosphate and said amino acid being added to said alkaline dye bath being at least 0.7 g./l., and dyeing such fibers therein.

8. A composition for inhibiting the precipitation of calcium, magnesium, iron, and other polyvalent metals in an aqueous alkaline solution, said composition consisting of a mixture of a polymeric alkali metal phosphate and triethanolamine in a proportion of at least 2:1 of phosphate to amine.

9. A composition for inhibiting the precipitation of calcium, magnesium, iron, and other polyvalent metals in an aqueous alkaline solution, said composition consisting of a mixture of a polymeric alkali metal phosphate and an alkali metal salt of ethylene diamine tetra-acetic acid in a proportion of about 1:4 of phosphate to tetraacetate.

10. A composition for inhibiting the precipitation of calcium, magnesium, iron, and other polyvalent metals in an aqueous alkaline solution, said composition consisting of a mixture of a polymeric alkali metal phosphate and an alkali metal salt of an alkylene polyamine polyacetic acid in a proportion of about 1:4 of phosphate to polyacetate.

11. The process of inhibiting the precipitation of calcium, magnesium, iron, and other polyvalent metals in an aqueous alkaline solution, said process consisting in adding to such a solution a mixture of a polymeric alkali metal phosphate and triethanolamine in an amount sufficient to react substantially completely with said polyvalent metals and to form therewith soluble complex compounds, the amount of said polymeric alkali metal phosphate in said mixture being substantially larger than the amount of said triethonalamine therein, the amount of said mixture added to said aqueous alkaline solution being at least 0.7 g./l.

12. The process of inhibiting the precipitation of calcium, magnesium, iron, and other polyvalent metals in an aqueous alkaline solution, said process consisting in adding to such a solution a mixture of a polymeric alkali metal phosphate and an alkali metal salt of ethylene diamine tetra-acetic acid in an amount sufficient to react substantially completely with said polyvalent metals and to form therewith soluble complex compounds, the amount of said polymeric alkali metal phosphate in said mixture being substantially smaller than the amount of said alkali metal salt of ethylene diamine tetra-acetic acid, the amount of said mixture added to said aqueous alkaline solution being at least 0.7 g./l.

13. The process of inhibiting the precipitation of calcium, magnesium, iron, and other polyvalent metals in an aqueous alkaline solution, said process consisting in adding to such a solution a mixture of a polymeric alkali metal phosphate and an alkali metal salt of an alkylene polyamine polyacetic acid in an amount sufficient to react substantially completely with said polyvalent metals and to form therewith soluble complex compounds, the amount of said polymeric alkali metal phosphate in said mixture being substantially smaller than the amount of said alkali metal salt of an alkylene polyamine polyacetic acid, the amount of said mixture added to said aqueous alkaline solution being at least 0.7 g./l.

References Cited in the file of this patent

UNITED STATES PATENTS

| 2,396,938 | Bersworth | Mar. 19, 1946 |
| 2,471,645 | Morris et al. | May 31, 1949 |
| 2,509,440 | Little | May 30, 1950 |
| 2,544,649 | Bersworth | Mar. 13, 1951 |
| 2,589,195 | Monson | Mar. 11, 1952 |
| 2,723,956 | Johnson | Nov. 15, 1955 |
| 2,729,557 | Booth et al. | Jan. 3, 1956 |
| 2,783,200 | Crum et al. | Feb. 26, 1957 |

FOREIGN PATENTS

| 568,000 | Great Britain | Mar. 13, 1945 |

OTHER REFERENCES

J.S.D.C., vol. 70, No. 7, July 1953, pages 278–283.

Niven: "Industrial Detergency," N.Y., pub. by Reinhold, 1955, pages 47–50 relied upon.